United States Patent [19]

Anderson et al.

[11] 4,187,488
[45] Feb. 5, 1980

[54] REVERBERATION BACKSCATTER MEASUREMENT SYSTEM

[75] Inventors: William B. Anderson, Silverdale; David B. Markwald, Bremerton, both of Wash.

[73] Assignee: The United States of America as represented by the Secretary of the Navy, Washington, D.C.

[21] Appl. No.: 888,080

[22] Filed: Mar. 20, 1978

[51] Int. Cl.² ............................................. G01S 9/66
[52] U.S. Cl. ......................................... 367/13; 367/87
[58] Field of Search ........................ 340/3 R; 364/803

[56] References Cited

U.S. PATENT DOCUMENTS

| | | | |
|---|---|---|---|
| 3,757,287 | 9/1973 | Bealor, Jr. | 340/3 R |
| 3,832,537 | 8/1974 | Marutani | 340/3 R |
| 3,860,900 | 1/1975 | Scudder | 340/3 R |
| 4,114,153 | 9/1978 | Neidell | 340/3 R |

*Primary Examiner*—Richard A. Farley
*Attorney, Agent, or Firm*—R. S. Sciascia; Charles D. B. Curry

[57] ABSTRACT

A reverberation backscatter measurement system for providing in situ measurement of acoustic backscatter levels from point source scatterers or the target size of individual scatterers within or at the boundaries of the transmitting medium. The volume scattering strength, a calculated value from measured data, is the logarithmic ratio of the reflected intensity to the incident intensity at a unit distance from the acoustic center of the scatterers. The system accurately measures the parameters of volume scattering strength (S) and target strength (TS) and has application in the measurement and determination of sonar system performance and target strengths of vessels and their wakes. It also may be used in fisheries for biological studies in zooplankton population and distribution assessments. A data processing system is also provided to effectively and accurately process reflected signals indicating target strength and scattering strength.

9 Claims, 4 Drawing Figures

FIG-1A

FIG_1B

FIG _ 2

FIG_3

REVERBERATION BACKSCATTER MEASUREMENT SYSTEM

BACKGROUND OF THE INVENTION

1. Field of the Invention.

The present invention relates to an underwater acoustic system and more particularly to a reverberation backscatter measurement system.

2. Description of the Prior Art.

There is an increasing need to be able to accurately identify underwater objects by means of sonar systems and a continuing effort exists on the part of many researchers to develop accurate and reliable information from the reflected signals or backscatter of sonar systems. There are many factors and problems which contribute to preventing the accurate identification of an underwater object from its reflected signals. It has been found that such factors as the speed of the sound in the media, the range of the target, the frequency of the transmitted acoustic signal, the pulse width of the transmitted acoustic signal and the transducer characteristics contribute in different ways to making it difficult to determine the meaning of the reflected sonar signals. Various of these factors contribute in different ways to making it difficult to determine actual target strength (TS) which is a measure in decibels of the reflected target signals. Various of these factors also contribute in different ways to making it difficult to determine actual scattering strength (S) which indicates the amount of reflected signal per unit volume as compared to the transmitted signal per unit volume. It has been also found to be quite difficult to effectively process data that has been reflected by underwater targets, especially when it is being received over long periods of time.

The present invention overcomes many of these problems by providing a real-time reverberation backscatter measurement system that compensates for many degradation factors and makes it possible to very accurately identify underwater objects from their reflected signals.

SUMMARY OF THE INVENTION

Briefly, the present invention comprises a reverberation backscatter measurement system for providing in situ measurement of acoustic backscatter levels from point source scatterers or the target size of individual scatterers within or at the boundaries of the transmitting medium. The volume scattering strength, a calculated value from measured data, is the logarithmic ratio of the reflected intensity to the incident intensity at a unit distance from the acoustic center of the scatters. The system accurately measures the parameters of volume scattering strength (S) and target strength (TS) and has application in the measurement and determination of sonar system performance and target strengths of vessels and their wakes. It also may be used in fisheries for biological studies in zooplankton population and distribution assessments. A data processing system is also provided to effectively and accurately process reflected signals indicating target strength and scattering strength.

STATEMENT OF THE OBJECTS OF THE INVENTION

An object of the present invention is to provide a real-time reverberation backscatter measurement system;

Another object of the present invention is to provide an underwater sonar system that very accurately identifies underwater objects;

Still another object of the present invention is to provide an underwater detection system that minimizes the inherent degradation effects of backscatter in an underwater environment;

Still another object of the present invention is to provide an underwater detection system that is capable of measuring target strength (TS);

Still another object of the present invention is to provide an underwater detection system that is capable of measuring scattering strength (S);

A still further object of the present invention is to provide an underwater detection system that takes into account such factors as the speed of the sound in the media, the range of the target, the frequency of the transmitted acoustic signal, the pulse width of the transmitted acoustic signal and the transducer characteristics to determine the meaning of the reflected sonar signals;

Still another object of the present invention is to provide a technique for processing the target strength (TS) and scattering strength (S) data received from reflected targets;

Other objects, advantages and novel features of the invention will become apparent from the following detailed description of the invention when considered in conjunction with the accompanying drawings wherein:

DESCRIPTION OF THE PREFERRED EMBODIMENT

Figure 1A:
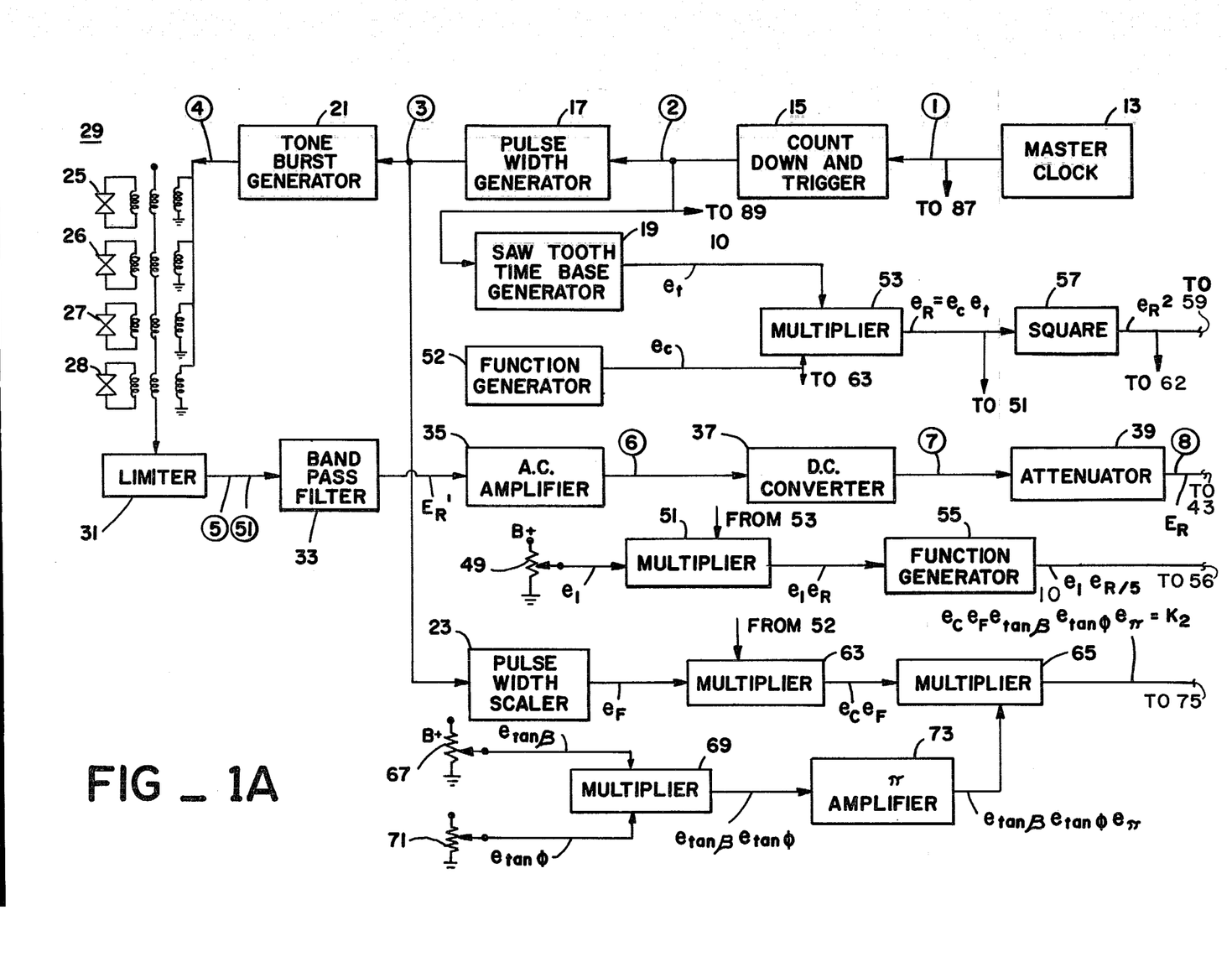
FIGS. 1A and 1B together comprise a block diagram of the reverberation backscatter measurement system of the present invention.
Figure 1B:
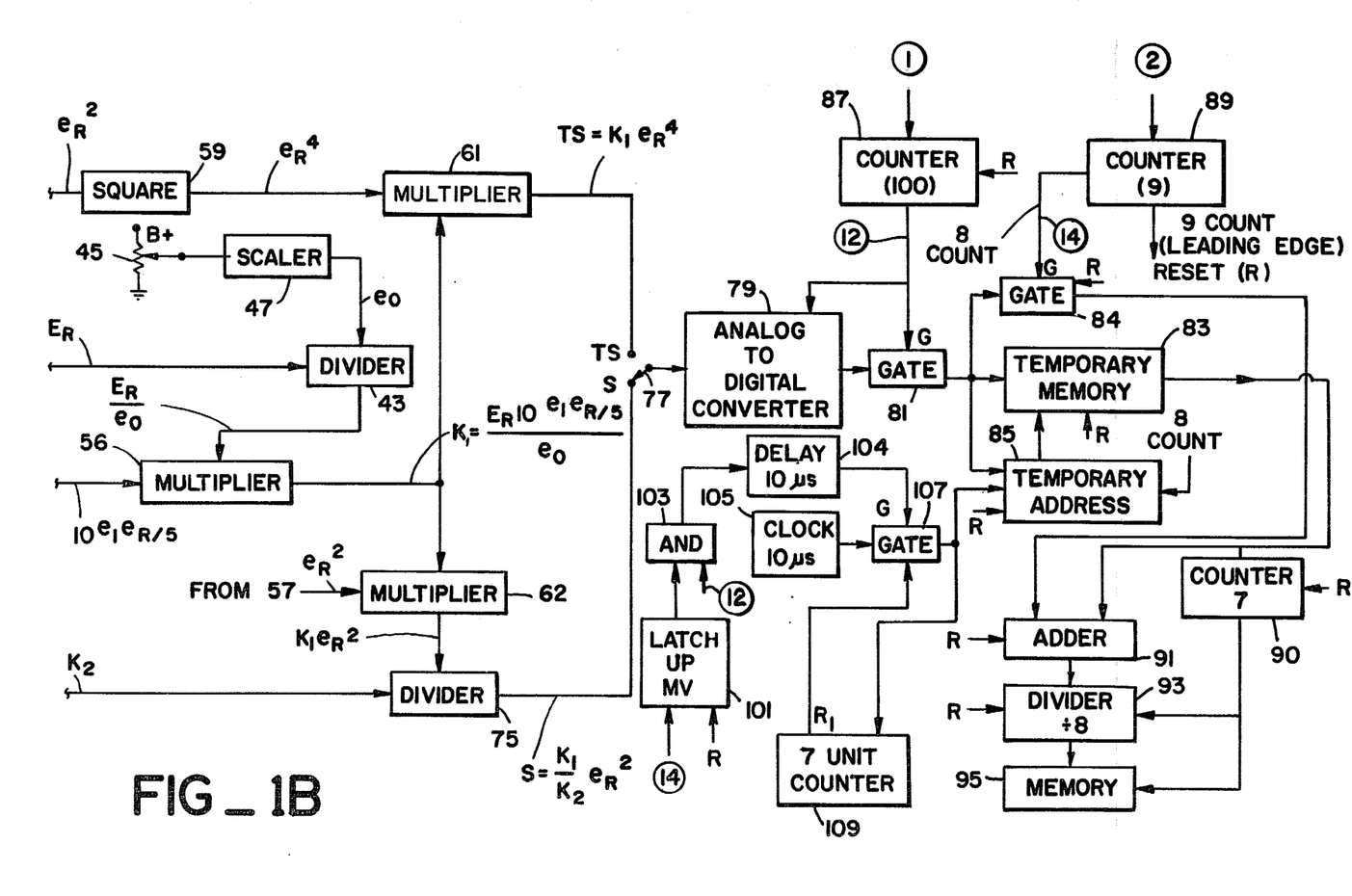

In FIG. 1 is illustrated the reverberation backscatter measurement system of the present invention. This system provides an in situ measurement of acoustic backscatter levels from point source scatterers or the target size of individual scatterers within or at the boundaries of the transmitting medium. This system calculates the acoustic volume scattering strength which is the logarithmic ratio of the reflected intensity to the incident intensity at a unit distance from the acoustic center of the scatterers. The primary object of this system is to provide highly reliable information concerning the reflectivity of the target, such as the exact target strength of a submarine, or the density of a layer of biota at some distance from the sonar transducers. This system takes into account such factors as distance from the object, the spreading losses of both the transmitted and reflected acoustic signal, the attenuation characteristics of the particular frequency of transmission and reflection and various other factors which will modify the actual received signal as compared to the ideal received signal.

Figure 2:
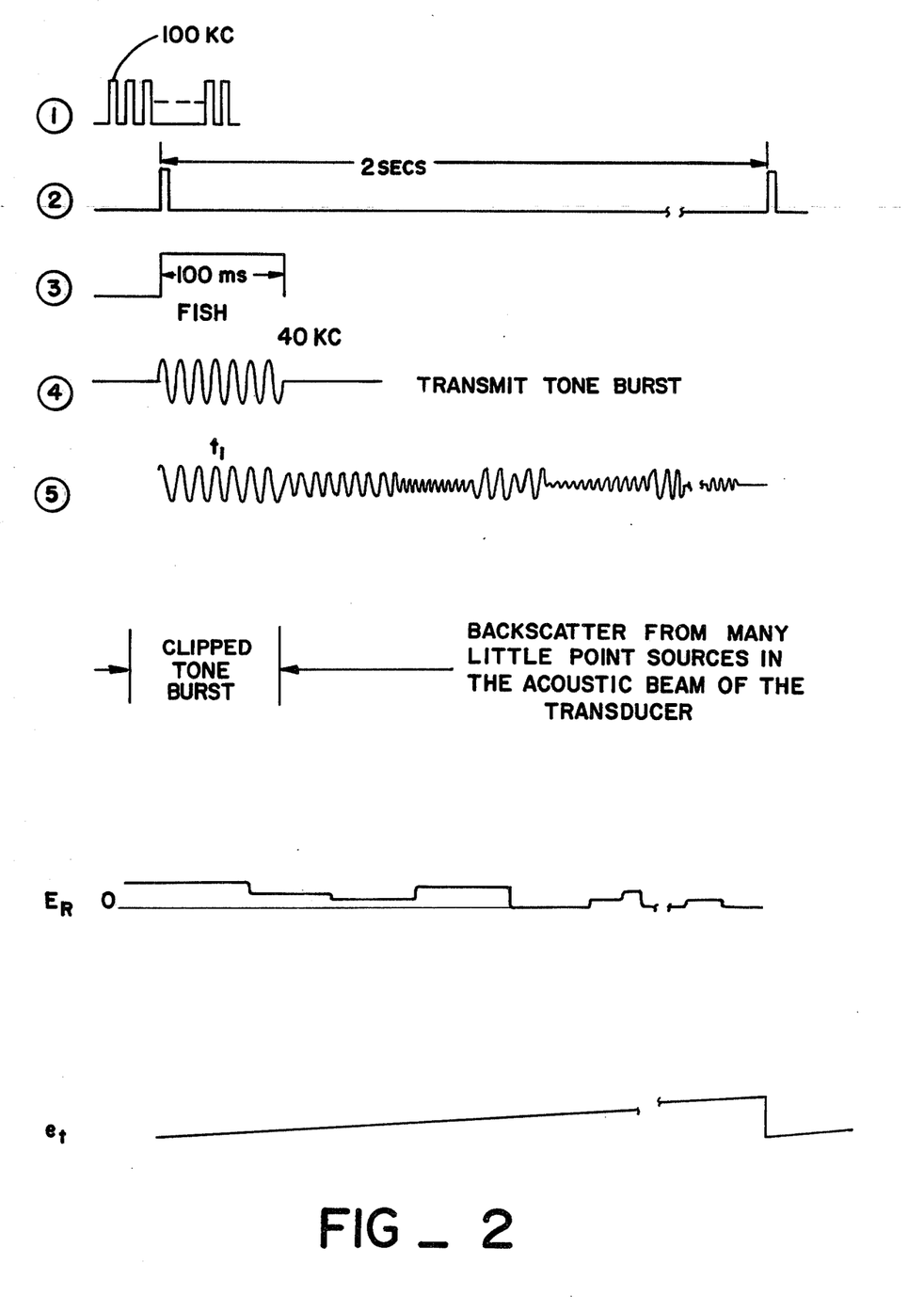
FIG. 2 is a timing diagram illustrating the operation of the analog aspect of the system of FIGS. 1A and 1B.
Figure 3:
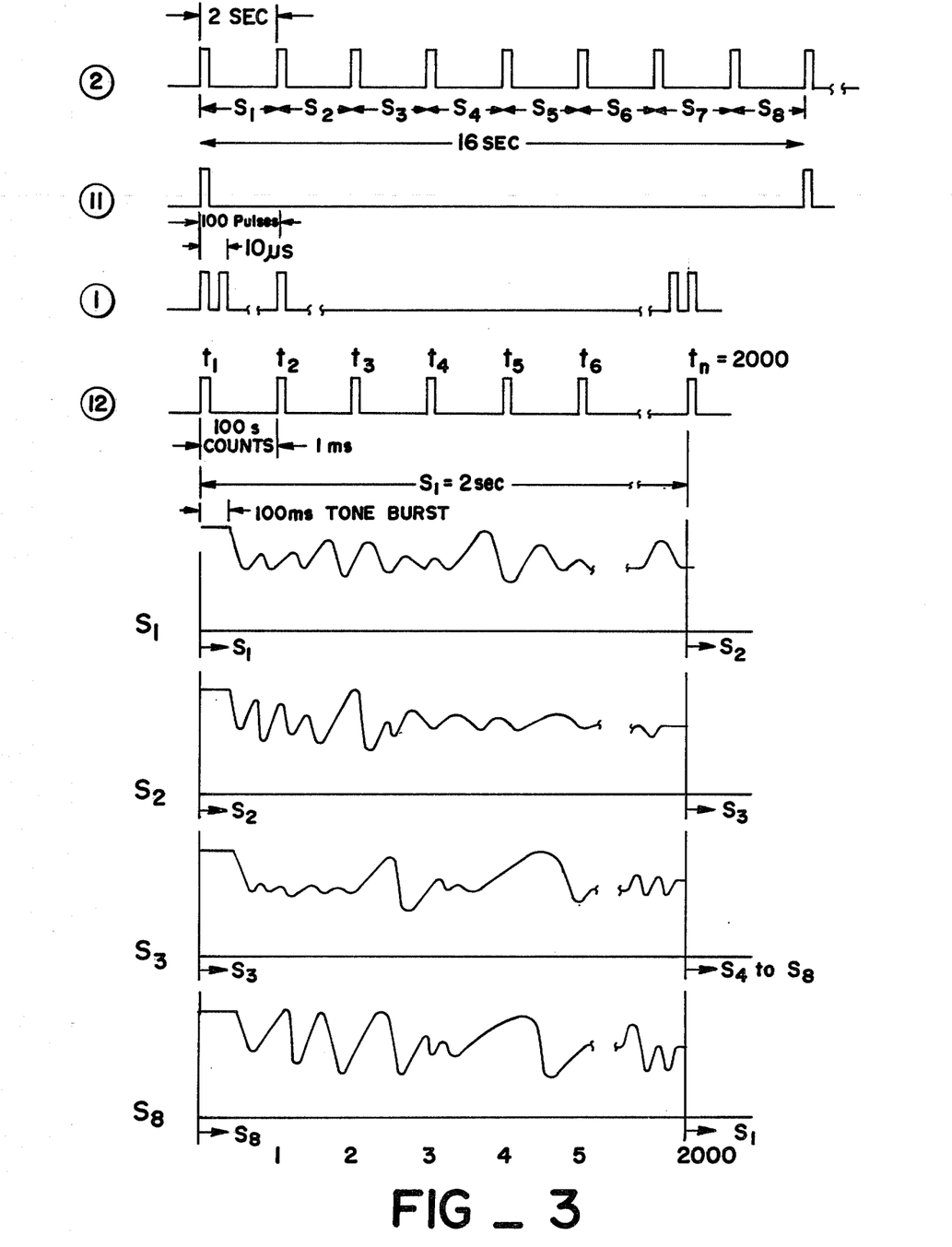
FIG. 3 is a timing diagram illustrating the operation of the digital data processing aspect of the system of FIGS. 1A and 1B.

The reverberation backscatter measurement system of FIGS. 1A and 1B is to be considered in conjunction with the timing diagrams of FIGS. 2 and 3. The system includes a master clock 13 having a signal 1, the output of which is connected to a countdown and trigger circuit 15, having a signal 2, the output of which is applied to pulse width generator 17 and saw-tooth time base generator 19. The output of generator 17, having a signal 3, is applied to tone burst generator 21 and to pulse width scaler 23. The output of generator 21, having a signal 4, is applied through an amplifier, not shown, to the input coils, of a plurality of hydrophones including piezoelectric elements 25, 26, 27, and 28. It should be noted that the hereinafter described system includes a plurality of amplifiers that are not shown for reasons of clarity. It will be obvious to one skilled in the art that these amplifiers will be used to provide isolation, or amplification, or inversion, or change of sign of signals where needed.

The reflected or backscatter signals from objects or point sources in medium 29 are received by the pick-up coils of the hydrophones and are applied to the input of limiter 31. Limiter 31 functions to limit the amplitude of the transmit signal, such as the immediately reflected tone burst, as shown in curve 4 of FIG. 2. The output of limiter 31, signal 5 of FIG. 2, represents the immediately induced signal and the reflected backscatter signal.

The output of limiter 31 is applied to the input of band pass filter 33. Band pass filter 33 is used to reject all signals except the backscatter signals. For example, the band pass filter may be adjusted to reject frequencies of the sonar of nearby vessels which would interfere with the backscatter caused by the test frequency. The output of filter 33 is indicated as $E_R'$ and is applied to the input of AC amplifier 35 the output signal of which is applied to the input of DC converter 37. DC converter 37 converts the envelope of the AC signal to a DC signal. The DC output signal of DC converter 37 is applied to the input of calibration device 39 the output signal, $E_R$, of which is applied to one input of divider 43. Calibration device 39 may be an attenuator or amplifier that functions to calibrate $E_R$ against a known standard making this signal equivalent to the squared pressure level at the face of the receiving hydrophones 25, 26, 27 and 28. That is, a standard transducer is placed in water 29 a specified distance from the hydrophones of system 11 and then activated. Calibration device 39 is adjusted so that value $E_R$ received from the standard transducer has a specified or standard amplitude.

A potentiometer 45 and scaler 47 provide a signal $e_o$, which is a scaled signal proportional to the source level of the transmitted signal, that is applied to the other input of divider 43. A potentiometer 49 provides a signal $e_1$, which represents attenuation of the acoustic signal at the transmit frequency and is applied to one input of multiplier 51. When signal $e_1$ and signal $e_R$ are multiplied the resultant is a signal proportional to attenuation loss of the acoustic source. The signal $e_R$, which represents actual target range, from multiplier 53 is applied to the other input of multiplier 51 and the output of signal $e_1 e_R$ is applied to function generator 55 which provides an output signal $10^{2e_1 e_R/10}$ or $10^{e_1 e_R/5}$, which represents losses to the target from attenuation, is applied to one input of multiplier 56. The output of divider 43 is applied to the other input of multiplier 56 which provides an output signal $$K_1 = \frac{E_R \, 10^{e_1 e_R/5}}{e_o}.$$

The output signal 2 of countdown and trigger circuit 15 is applied to the input of saw-tooth time base generator 19 which provides an output signal $e_t$, as illustrated in FIG. 2. From FIG. 2 it can be seen that $e_t$ is a ramp signal that linearly increases for a time of about two seconds, for example, which corresponds to the time between the trigger pulses from the output of trigger circuit 15. Diode function generator 52 provides an output signal $e_c$, which represents the speed of sound in the particular water environment, that is applied to one input of multiplier 53 and the output signal $e_t$ from generator 19 is applied to the other input. The output signal $e_R = e_c e_t$, representing actual target range, is applied to the input of multiplier 51 and to the input of square device 57. The output signal from square device 57 $e_R^2$, which represents spherical spreading losses from the source to the target, is applied to the input of another square device 59 the output signal $e_R^4$, which represents spherical spreading losses from source to target and return, and is applied to one input of multiplier 62. The output signal $K_1$ from multiplier 56 is applied to the other input of multiplier 61. From this it can be seen that the output of multiplier 61 is the signal $$TS = \frac{E_R \, e_R^4 \, 10^{e_1 e_R/5}}{e_o}$$

or $K_1 e_R^4$ which represents the target strength TS the significance of which will be hereinafter explained.

The output signal 3 of pulse width generator 17 is applied to the input of pulse width scaler 23. Scaler 23 provides an output signal $e_F$ the voltage of which is linearly proportional to the time duration of the output signal 3 from pulse width generator 17. It should be noted that generator 17 is adjustable and will be selected to provide certain time duration pulse widths when looking for certain targets. For example, the time duration may be 10 milliseconds (ms) when looking for fish or small objects and may be 300 ms when looking for larger objects such as a submarine. The output signal $e_F$ from scaler 23 is applied to the input of multiplier 63 where it is multiplied by the signal $e_c$ from diode function generator 52 developing a signal proportional to pulse length times sound speed. The signal $e_c e_F$ from multiplier 63 is applied to one input of multiplier 65.

A potentiometer 67 provides a signal $e_{tan\beta}$ that is applied to one input of multiplier 69 and potentiometer 71 provides a signal $e_{tan\phi}$ that is applied to the other input of multiplier 69. The output $e_{tan\beta} e_{tan\phi}$ is applied to the input of $\pi$ amplifier 73 where it is multiplied by $\pi$. The output signal $e_\pi e_{tan\beta} e_{tan\phi}$ is applied to the other input of multiplier 65 the output signal, $e_c e_F e_\pi e_{tan\beta} e_{tan\phi} = K_2$ of which is applied to one input of divider 75. The output Signal $K_1$ of multiplier 56 is applied to one input of multiplier 62. The output signal $e_R^2$ from square device 57 is applied to the other input of multiplier 62 which provides an output signal $K_1 e_R^2$ that is applied to the other input of divider 75. From this it can be seen that the output of divider 75 is the signal $$S = \frac{e_R^2 E_R \, 10^{e_1 e_R/5}}{e_o e_c F^e \tan\beta e_{\tan\phi} e_\pi} \text{ or } \frac{K_1}{K_2} e_R^2$$

which represents the scatter S the significance of which will be hereinafter explained.

The target strength signal TS and the scatter signal S are selectively applied through selector switch 77 to the input of analog to digital converter 79.

In view of the foregoing it can be seen that the signal TS represents the acoustic target strength in db of a fish, a school of fish, a submarine or any other acoustic reflecting object in the water. However, it has been found desirable and necessary to apply to above correction factors to the reflected signal $E_R$ to provide a normalized signal, referred to as target strength (TS).

The target strength (TS) is measured in decibels (db) and is based on the amplitudes of the reflected signal from the target and is modified by actual ocean parameters and distance to accurately determine the actual target strength. That is, the reverberation backscatter system modifies the received signal $E_R$ by the following factors to give an accurate measure of target strength.

(1) One factor is attenuation due to the frequency of the transmitted signal. High frequency transmission signals attenuate more than low frequency transmission signals and the used frequency is compared to a known standard frequency for correction. Hence, the losses due to attenuation are expressed by generator 55 as:

$$10^{e_1 e_R/5}$$

where
$e_1$ is attenuation due to frequency
$e_R$ is range (2) Another factor is the speed of sound in the water environment where measurements are being made. That is, prior to a test a probe is dropped which measures temperature and salinity at particular depths. Since the speed of sound in water is dependent upon these factors, function generator 52 is set to provide the speed of sound for the particular environment as represented by the signal $e_c$. Knowing the speed of sound in the water environment the range between the source and target can be determined from the relationship:

$$e_R = e_c e_t$$

where
$e_R$ = the signal representing range at any instant of sampling time
$e_c$ = the signal representing the speed of sound in water in the sampling environment
$e_t$ = the signal representing the time at any instant of sampling time.

Since target strength (TS) is inversely proportional to the square of the distance of transmitted energy and inversely proportional to the square of the distance of the reflected energy it is necessary to define TS in terms of $e_R^4$. Therefore target strength in db (TS) is defined by the relationship:

$$TS = \frac{e_R^4 E_R \, 10^{e_1 e_R/5}}{e_o} \quad (1)$$

where $E_R$ = the voltage representing the measurement of reflected signal
$e_o$ = strength of the transmitted signal (this is determined by setting potentiometer 45 and scaler 47 against values of a known standard)—this is done in this manner since there is no simple way to measure the actual transmitted power.
$10^{e_1 e_R/5}$ is as above defined.
$e_R^4$ is as above defined.

Scattering strength S is defined by the relationship:

$$S = \frac{e_R^2 E_R \, 10^{e_1 e_R/5}}{e_o e_c F^e \tan\beta e_{\tan\phi} e_\pi} = \frac{K_1}{K_2} e_R^2 \quad (2)$$

It should be noted that the scattering strength S is the target strength per unit volume db/m³ and indicates the amount of reflected signal per unit volume as compared to the transmitted signal per unit volume. Scattering strength S is also dependent upon spherical spreading from the source to the target and return as it is dependent on the previously defined attenuation due to the frequency of the transmitted signal $10^{e_1 e_R/5}$. As a consequence the sonar equation must make corrections for these reductions in signals when computing the scattering strength. Since the objective is to calculate the target strength of a unit volume of water along the acoustic axis of the transmitting transducer it is necessary to develop a relationship which defines the volume of ensonification along this axis as a function of time and range. This can be partically expressed in the relationship:

$$e_c F^e \tan\beta e_{\tan\phi} e_\pi$$

where
$e_c$ = the signal representing the speed of sound in the water
$e_F$ = the pulse length of the transmitted signal and is used in calculating the volume of water along the acoustic axis ensonified
$\beta$ = the minor axis of transducer acoustic beam angle
$\alpha$ = the major axis transducer acoustic beam angle
and the combined expression
$e_{\tan\beta} e_{\tan\phi} e_\pi$ = the signal factor based on the major and minor axes of the transducer acoustic beam angle.

From this it can be seen that target strength (TS) and scattering strength (S) are corrected to compensate for a plurality of error inducing conditions and therefore very accurately depict the actual conditions. The system includes a switch 77 for selectively sampling either the target strength (TS) or the scattering strength (S). The selected signal is then processed by a digital data processing system (FIG. 1B) that is dependent upon the control signals 1 and 2 from master clock 13 and countdown and trigger 15 of the analog system (FIG. 1A).

The output of switch 77 is applied to the input of analog to digital converter 78 the output of which is applied through gate 81 to the input of temporary memory 83, gate 84 and temporary address device 85. The output signal 1 from master clock 13 is applied to the input of counter 87 which provides an output gate signal 12 upon receiving a 100 unit count, for example, from clock 13. The output pulse from counter 87 is applied to the gate input of gate 81 so that the binary value of the analog signal at that point in time is stored in temporary memory 83 and its address is stored in temporary address device 85. From signal 12 of FIG. 3 it can be seen that during sample period $S_1$ (which is of 2 second duration in the example given) that 2,000 samples (2 s/1 ms=2,000) will be gated by gate 81 into temporary memory 83 during the period that the gate signal 12 is present. That is, analog sample curve $S_1$ of FIG. 3 will be sampled at times $t_1\, t_2\, t_3\, t_4\, t_5\, t_6\text{---}t_n$ where n=2,000 samples. It should be noted that this sample period $S_1$ is identified by the output signal 2 from countdown and trigger device 15 as are sample periods $S_2\, S_3\, S_4\, S_5\, S_6\, S_7$ and $S_8$. This signal 2 is applied to the input of counter 89 which will provide an output signal to the gate input of latchup gate 84 at the count of eight (8) which represents the start of the last sample period $S_8$ as shown in FIG. 3. It should be noted that the end of the total sampling period ($S_1$ through $S_8$) will occur at the start of the ninth pulse signal 2 from trigger circuit 15. Therefore, a reset signal R is provided, at the end of eight sample periods $S_1$ through $S_8$ (leading edge of ninth pulse), by counter 89 to reset the various circuits as illustrated in FIG. 1B so that the next total sampling period may be started.

It should be noted that the analog signals are continuously sampled (in binary format) for a 16 second time period, for example. That is, sample periods $S_1$ through $S_8$, shown in the upper curve of FIG. 3, are each 2 seconds in time duration and correspond to the $S_1\, S_2\, S_3\text{---}S_8$ analog sample curves of FIG. 3. These analog sample curves are converted to binary format by analog to digital converter 79. The analog to digital conversion may be performed at times determined by a clock within converter 79 or it may be performed upon the occurrence of each pulse as illustrated. In either event the binary representation of analog sample curve is gated out by gate 81 upon the occurrence of each pulse from counter output signal 12. During the sample period $S_1$ there will be 2,000 samples and gate pulses as shown by curve 12 in FIG. 3. The 2,000 binary samples of analog curve $S_1$ are addressed by temporary address device 85 and stored in temporary memory 83. Then the 2,000 binary samples of analog curve $S_2$ are similarly stored in temporary memory 83. This is then repeated for analog curves $S_3\, S_4\, S_5\, S_6$ and $S_7$ (but not $S_8$). Therefore, in the example given there will be 14,000 binary words stored in temporary memory 83 that represent 2,000 sample points on each of analog curves $S_1\, S_2\, S_3\, S_4\, S_5\, S_6\, S_7$ as illustrated in Table I shown below.

TABLE I

|  | Sequence from Converter 79 | 14,000 BINARY WORDS STORED IN TEMPORARY MEMORY 83 | Sequence to Adder 91 |
|---|---|---|---|
| Temporary Memory 83 | $S_1$ | $t_1 t_2 t_3 t_4 t_5 t_6\text{-}t_{2000}$ | 2 |
|  | $S_2$ | $t_1 t_2 t_3 t_4 t_5 t_6\text{-}t_{2000}$ | 3 |
|  | $S_3$ | $t_1 t_2 t_3 t_4 t_5 t_6\text{-}t_{2000}$ | 4 |
|  | $S_4$ | $t_1 t_2 t_3 t_4 t_5 t_6\text{-}t_{2000}$ | 5 |
|  | $S_5$ | $t_1 t_2 t_3 t_4 t_5 t_6\text{-}t_{2000}$ | 6 |
|  | $S_6$ | $t_1 t_2 t_3 t_4 t_5 t_6\text{-}t_{2000}$ | 7 |
|  | $S_7$ | $t_1 t_2 t_3 t_4 t_5 t_6\text{-}t_{2000}$ | 8 |
| To Adder 91 | $S_8$ | $t_1 t_2 t_3 t_4 t_5 t_6\text{-}t_{2000}$ | 1 |

The techniques used for addressing and storing this series of incoming binary signals are well known to those skilled in the art and therefore will not be explained. However, in accordance with the present invention this stored information is averaged in sequence with each of the next 2,000 sample points of the analog curve $S_8$ (in binary format) and then permanently stored in memory 95 after being averaged by adder 91 and divider 93. The technique for achieving this is shown in FIG. 1B where gate 84 is turned on at the beginning of the sampling curve $S_8$ by an eight count signal 14 from counter 89. Therefore, the binary representation of each of the 2,000 sampled points of curve $S_8$ are serially transferred at times $t_1\, t_2\, t_3\, t_4\, t_5\, t_6\text{---}t_{2000}$ to adder 91 as shown by curve 12 of FIG. 3 and Table I of FIG. 4. At the end of the transfer of the binary word sampled at time $t_1$, curve $S_8$, then the binary words, stored in temporary memory 83, that represent curves $S_1\, S_2\, S_3\, S_4\, S_5\, S_6$ and $S_7$ at times $t_1$ are serially transferred to adder 91. This is achieved by means of latchup multivibrator 101, AND gate 103, delay 104, free running clock 105, gate 107 and 7 unit counter 109. Signal 14 is applied to the input of multivibrator 101 the output signal of which is continuous (during the period $S_8$) until the occurrence of the reset signal R (which occurs at the end of $S_8$ or the beginning of the next $S_1$ period or nine count) from counter 89. The output signal from multivibrator 101 is applied to one input of AND gate 103 and signal 12 from counter 87 is applied to other input. The output signal from AND gate 103 is applied through delay 104 to the gate input of gate 107. The delay device may be two series connected multivibrator that introduce a delay of sufficient time duration, for example 10 microseconds ($\mu s$), to allow the transfer of the $S_8$ binary representation at each of the sample times, for example time $t_1$, through gate 84 to adder 91. After the transfer is complete then gate 107 turns on and allows the serial transfer of seven clock pulses from free running clock 105 to the input of temporary address and control 85. The repetition rate of clock 105 is selected to allow address processing, retrieval and transfer of a single word to adder 91. A repetition rate of 10$\mu s$, for example, for clock 105 is sufficient for this purpose. In FIG. 3, curves $S_1\, S_2\, S_3\, S_8$, the clipped tone burst signal is illustrated by the initial straight portion of the curves. Following the tone burst the reflected analog signal will be received as illustrated. Therefore, in actual practice the initial 100 ms, sample times $t_1$ through $t_{100}$, will be the constant amplitude tone burst and the following samples, $t_{101}$ through $t_{2000}$, will be of the reflected signals.

In accordance with the present invention it has been found that the most meaningful information concerning volume scattering strength (S) and target strength (TS) is achieved by summing each of the sample points ($t_1\, t_2\text{---}t_{2000}$) of the sample curves ($S_1\, S_2\text{---}S_8$) and then dividing by the number of curves to provide an average value for each of the sample points ($t_1\, t_2\text{---}t_{2000}$). It should be noted that the number of curves may be varied and the number of sample points may be varied. However, it is important to note that limits may be set by the nature of the targets. That is, meaningful averaging over a long period of time may be achieved when the relative movement of the target is small; however, when the relative target movement is large then the averaging time must be reduced. It has been found that effective averaging is achieved for most undersea water sonar detection when a total sample duration of 16 seconds with 8 two second sample frames are employed. In this manner highly reliable and meaningful information concerning volume scattering strength (S) and target strength (TS) is obtained.

Averaging is achieved for this 16 second period by means of the above described transfer to adder 91 of the 14,000 words (curves $S_1$ through $S_7$) of sampled information from temporary memory 83 in conjunction with the realtime sampling of the last sample (curve $S_8$). The output of adder 91 represents the sum of the sample points on curve $S_1$ through $S_8$ that occur at time $t_1$. This value is then divided by 8 by divide circuit 93, which represents the average value of the eight samples at time $t_1$. This average value is then stored in a permanent memory 95.

This sequence is then repeated for the remaining 1999 points ($t_2 t_3 t_4 - t_n$) of the $S_8$ sample. At the end of the $S_8$ sample, counter 89 will receive the ninth count pulse and the system will be immediately reset for the next run. It will be obvious to those skilled in the art of data processing that the specific timing of the clock pulses for operating temporary address 85, adder 91, divider 93 and memory 95 will be in the order of a few microseconds or even nanoseconds and the operation of those units must be sequential so that their functions are performed as described. In practice there is ample time to perform the above described control operations and it is, therefore, possible to have a realtime reverberation backscatter measurement system that provides highly meaningful information concerning volume scattering strength (S) and target strength (TS) for immediate or subsequent use and analysis.

What is claimed is:

1. A reverberation backscatter measurement system comprising:
   (a) means for transmitting an acoustic signal in a fluid environment;
   (b) means for receiving reflected acoustic signals of said transmitted acoustic signal from a target and for converting said reflected acoustic signal into a corresponding electrical signal;
   (c) means for calibrating and adjusting said electrical signal against a standard signal, said calibrating means receiving as input said electrical signal;
   (d) first correction means receiving as input the output of said calibrating means, said first correction means providing an output signal representing the acoustic target strength of said reflected acoutic signal corrected for velocity of sound in said fluid medium in situ and for the frequency used for said transmitted signal;
   (e) second correction means receiving as input the output of said calibrating means, said second correction means providing a parallel output signal to said output of said first correction means representing said acoustic target strength per unit volume of fluid medium of said reflected acoustic signal corrected for the wide and narrow beam angles of said transmitting means and for the pulse length of said transmitted signal; and
   (f) means for selecting for analysis said output signal of said first correction means representing acoustic target strength of said reflected acoustic signal or said output of said second correction means representing acoustic target strength of said reflected acoustic signal per unit volume of said fluid medium.

2. The system of claim 1 wherein said first correction means includes:
   (a) means for velocity correcting said output of said calibrating means as a function of the speed of sound in said fluid environment in situ; and
   (b) means for frequency correcting said output of said calibrating means as a function of the frequency of said transmitted acoustic signal.

3. The system of claim 1 wherein said second correction means includes:
   (a) means for angle correcting said output of said calibrating means as a function of said wide and narrow acoustic beam angles of said transmitted acoustic signal; and
   (b) means for time correcting said output of said calibrating means as a function of said pulse length of said transmitted acoustic signal.

4. The system of claim 2 wherein:
   (a) said velocity correcting means includes a time-base generator, a speed of sound function generator, the output of said time-base generator and said speed of sound function generator connected to the input of a first multiplier; and
   (b) the output of said multiplier being applied to a means for range correcting said electrical signal as a function of range from said target.

5. The system of claim 4 wherein:
   (a) said range correcting means includes a first and a second squaring device and a second and a third multiplier;
   (b) the output of said first multiplier is operably connected to one input of said frequency correcting means and to the input of said first squaring device, the output of which is connected to the input of said second squaring device, the output of which is connected to one input of said second multiplier;
   (c) the output of said receiving means is operably connected to the input of said calibrating means, the output of which is operably connected to said third multiplier, the output of which is connected to the other input of said second multiplier; whereby
   (d) the output signal of said second multiplier represents said strength of said reflected acoustic signal from said target.

6. The system of claim 5 which includes:
   (a) means for representing the strength of said transmitted signal, the output of which is connected to one input of a first divider, said output of said calibrating means is connected to the other input of said first divider; the output of said first divider is connected to one input of said third multiplier, said output signal of said frequency correcting means connected to the other input of said third multiplier, the output of which is connected to said other input of said second multiplier.

7. The system of claim 2 wherein:
   (a) said frequency correcting means includes a transmit frequency indicator means representing the frequency of said transmitted signal, the output of which is connected to one input of a fourth multiplier, the output of said first multiplier connected to the other input of said fourth multiplier, the output of which is connected to the input of a logarithmic function generator, the output of which is connected to the other input of said third multiplier.

8. the system of claim 3 wherein said angle correcting means includes:
   (a) a first signal generator for generating an electric signal representing the tangent of said wide acoustic angle of said transmitting means, a second signal angle generator for generating an electrical signal representing the tangent of said narrow acoutic angle of said transmitting means, a fifth multiplier and an amplifier; and (b) the output of said first and said second signal angle generators being connected to the input of said fifth multiplier, the output of which is connected to the input of said amplifier.

9. The system of claim 3 wherein said time correcting means includes:
   (a) a pulse width scaler for generating an electrical signal representing an attenuation factor due to the pulse length of the transmitted signal;
   (b) a sixth multiplier, the output of a function generator representing the speed of sound in the fluid medium in situ being applied to one input of said sixth multiplier and the output of said time correcting means being applied to the other input of said sixth multiplier; and
   (c) a seventh multiplier, the output of said sixth multiplier being connected to one input of said seventh multiplier and the output of said angle correcting means being connected to the other input of said seventh multiplier.

* * * * *